United States Patent [19]
Kenyon

[11] 3,972,103
[45] Aug. 3, 1976

[54] AUTOMOBILE LOCK REMOVAL TOOL

[76] Inventor: David L. Kenyon, 1727 W. Royalton Road, Broadview Heights, Ohio 44147

[22] Filed: Mar. 12, 1975

[21] Appl. No.: 557,821

[52] U.S. Cl. ............................................. 29/263
[51] Int. Cl.² ........................................ B23P 19/04
[58] Field of Search ..................... 29/358, 263, 265

[56] References Cited
UNITED STATES PATENTS

| | | | |
|---|---|---|---|
| 2,050,005 | 8/1936 | Heegeman | 29/263 |
| 3,166,834 | 1/1965 | Newman | 29/263 X |
| 3,824,672 | 7/1974 | Michelson | 29/263 |

FOREIGN PATENTS OR APPLICATIONS

| | | | |
|---|---|---|---|
| 922,001 | 5/1947 | France | 29/263 |

Primary Examiner—Al Lawrence Smith
Assistant Examiner—Gary L. Smith
Attorney, Agent, or Firm—Bosworth, Sessions & McCoy

[57] ABSTRACT

A tool which obviates the necessity of disassembling the steering column of an automobile when removing the ignition lock cylinder. The tool has an inner collet with a lipped edge which engages the forward shoulder of the lock cylinder. An outer shell fits over the collet and aids the collet in gripping the shoulder. A bolt is threaded into the rear portion of the collet and extends outwardly through the rear portion of the shell. After the collet has engaged the shoulder and the outer shell is flush against the ignition lock housing, turning the bolt withdraws the collet, breaking the outer surface of the lock cylinder behind the retainer pin and freeing the cylinder so that it can be removed without difficulty.

3 Claims, 5 Drawing Figures

AUTOMOBILE LOCK REMOVAL TOOL

BACKGROUND OF THE INVENTION

1. Field of the Invention

This invention relates to the removal of key-operated lock cylinders, and specifically to the removal of lock cylinders located in the steering column of automobiles and similar vehicles.

2. Description of the Prior Art

In recent years the design of automobiles and similar vehicles has called for the location of the ignition lock to be on the side of the steering column. This lock serves the dual purpose of locking the steering column to prevent the wheels from being steered and locking the ignition system to prevent the motor from starting.

If the owner of a car loses his keys, jams his ignition lock, or for some other reason wishes to have the lock in his car changed, a locksmith or a mechanic may be called upon to remove the lock cylinder in the steering column and insert a new lock cylinder. In the past, changing the lock cylinder has necessitated removing the steering wheel and disassembling the steering column. The lock cylinder is held in place by a retainer pin, and the steering column had to be disassembled in order to free the retainer pin so that the cylinder could be removed. Removal of the steering wheel is complicated and time-consuming. In addition to pulling off the steering wheel, disassembling the steering column involves disconnecting the turn signals and flasher signals. Once the lock is removed, the entire steering column has to be reassembled which is an even more complicated procedure. The presence of a collaspable steering column or a tiltable steering wheel adds further complications. As a result, changing the lock cylinder in an automobile or a similar vehicle has been an expensive and tedious process.

SUMMARY OF THE INVENTION

An object of the present invention is to eliminate the necessity of removing the steering wheel when removing the lock cylinder from the steering column. Another object of the present invention is to provide a means for pulling the lock cylinder from its housing without damaging the housing or the steering column. Another object is to provide a means by which the lock cylinder can be removed in a short time.

With the ignition lock cap removed, the tool of present invention uses a collet to grip the outer shoulder of the lock cylinder. An outer shell fits over the collet and aids the collet in gripping the cylinder. The outer shell also fits against the lock housing to provide a fixed point so that the collet can pull out the cylinder when the collet is drawn into the shell by turning a bolt inserted through the shell and threaded into the collet. The withdrawing collet exerts an outwardly directed force on the cylinder which breaks the outer surface of the cylinder behind the retainer pin so that the cylinder can be easiy removed.

DESCRIPTION OF THE PREFERRED EMBODIMENT

Figure 1:
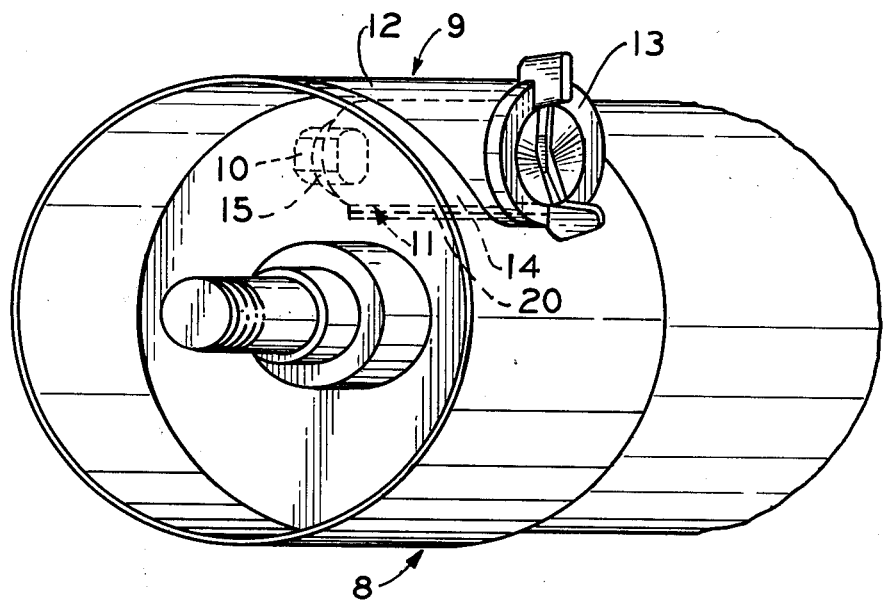
FIG. 1 is a perspective view of a conventional ignition lock mounted on a steering column.

Referring more particularly to the drawings and initially to FIG. 1, there is shown a conventional steering column 8 with a lock assembly 9. In a conventional construction of a lock assembly, the lock assembly 9 protrudes from the steering column 8 as depicted in FIG. 1. The conventional lock assembly 9 includes a connecting member 10, a lock cylinder 11, a lock housing 12, and a cylinder cap 13.

The connecting member 10 is connected to the steering wheel locking mechanism and the ignition system (not shown). When the member 10 is turned, the steering column unlocks and the ignition system is activiated.

The lock cylinder 11 is enveloped in the housing 12 which is part of the steering column 8. The lock cylinder 11 has an outer portion 14 surrounding and protecting the inner portion of the cylinder which includes the locking mechanism. The connecting member 10 is turned by means of engagement with the tail 15 which is connected with the inner portion of the lock cylinder 11. When a key is inserted into the keyhole 16 at the head of the lock cylinder, the locking mechanism inside the cylinder is released so that the key can be turned to rotate the inner portion of the cylinder and the tail 15 which turns the connecting member 10. The head 17 of the cylinder surrounds the keyhole 16 and protrudes from the forward end of the cylinder. The circumferential outer edge of the head 17 is provided with a shoulder 18.

The cylinder cap 13 normally fits tightly over the shoulder 18 and is held to the lock by the friction fit of the rearwardly extending flange 19 of the cap over the shoulder. The diameter of the shoulder 18 is less than the inside diameter of the housing 12 in order to provide space for the flange 19 of the cap 13 to fit. When a key is inserted into the keyhole 16 and turned, the cylinder cap 13 also turns. The ears on the cap 13 can be grasped to provide assistance in turning the key.

The head 17 and the tail 15 are connected by the inner portion of the cylinder so that, when the inserted key is turned, the head and the tail turn together. The outer portion 14 of the cylinder is restrained from turning by a ridge 20 which runs longitudinally along the outer portion and which fits within a groove 21 extending along the interior of the housing 12. A clip 22 also fits within the groove 21 and aids in restraining the outer portion 14 from turning.

The entire lock cylinder 11 is retained in the housing 12 by means of a retainer pin 23 which projects from the rearward side of the outer portion 14 of the cylinder. The retainer pin is urged outwardly by a spring (not shown) mounted within the cylinder. The retainer pin 23 fits into a slot 24 in the housing 12 which prevents the lock from being pulled out of the housing. The lock assembly just described is conventional for many presently manufactured automobiles.

The usual practice in removing the lock cylinder 11 from the housing 12 has been to disassemble the entire steering column. With the steering wheel removed and the steering column taken apart, a locksmith or mechanic then would take a screwdriver or a similar tool, break through a thin wall in the housing to expose the slot 24, and insert the tool through the slot and into engagement with the retainer pin 23. By simultaneously pressing in the spring-mounted retainer pin and pulling outwardly on the lock cylinder cap 13, the cylinder could be removed, but not without the expenditure of considerable time and effort.

The lock cylinder 11 can be removed more easily using the removal tool 26 of the present invention. In its preferred embodiment, the tool 26 comprises an outer shell 27 and a collet 28. The collet 28 has a generally cylindrical shape and has a plurality of longitudinally cut slots 30 which extend from the forward edge back along the collet length. For at least the length of the slots 30, the collet is hollow. The slots 30 define a plurality of laterally arched flat fingers 31.

Figure 3:
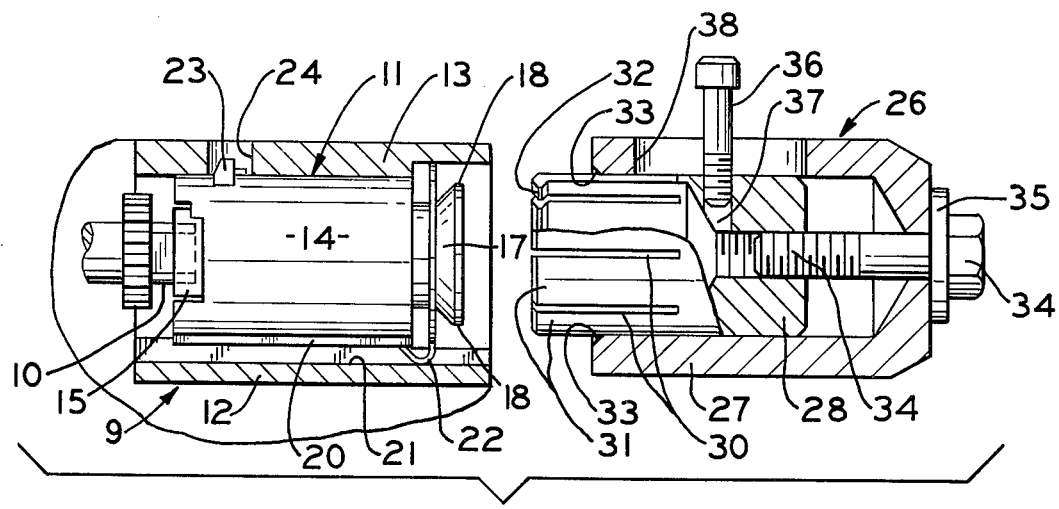
FIG. 3 is a side elevational view partially sectioned showing the tool of the present invention before insertion into the lock.
Figure 4:
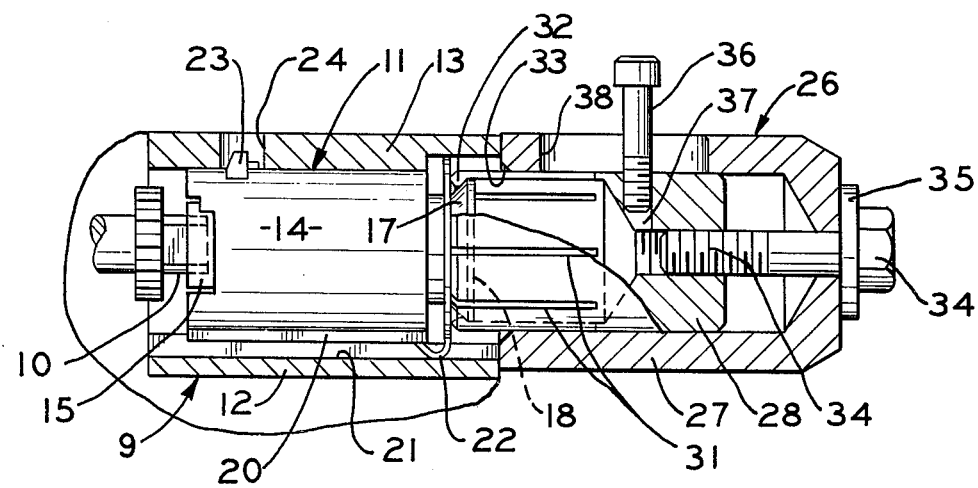
FIG. 4 is a side elevational view partially sectioned showing the tool attached to the lock shoulder.
Figure 5:
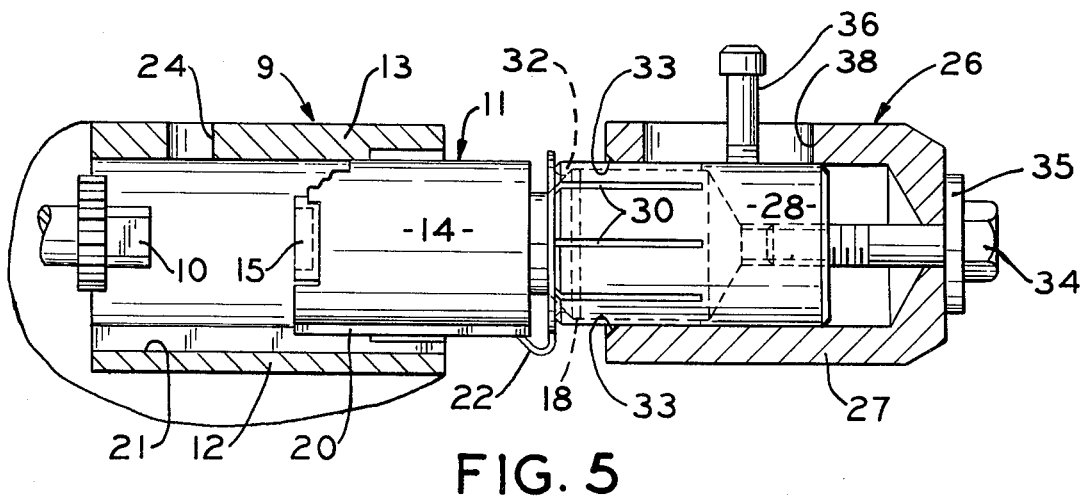
FIG. 5 is a side elevational view partially sectioned showing the lock cylinder being removed by the tool.

In order to enable the collet to grip the lock cylinder, a lip 32 protrudes radially inwardly at the end of each finger 31. The lips together extend around the entire interior circumference of the collet at the forward edge. The dimension of each lip 32 in the axial direction is slightly less than the exposed protrusion of the shoulder 18 so that the lip can fit over the shoulder. The collet material is slightly flexible. For example, the collet material is preferably chromium-molybdenum 4140 alloy steel hardened to a Rockwell C hardness of 40 to 45 and stress relieved. This flexibility enables the fingers 31 to bend slightly in a radially outward direction, as shown in FIGS. 3, 4 and 5. When the end of the collet is pushed into the space between the shoulder 18 and the interior of the housing 12, the fingers bend outwardly and the lips 32 are positioned into the space within the housing 12 and over the shoulder 18. To provide proper flexibility, the length of the slots 30 should be at least five times the width of the slot. Preferably, the slot length is ten times the lip width.

In order to cause the fingers firmly to grip the cylinder so that it can be removed, the outer shell 27 fits over the collet 28. The inner diameter of the shell 27 is only slightly larger than the outer diameter of the collet 28 so that the collet fits easily into the outer shell. The inner front edge 33 of the shell is beveled to aid in contracting the fingers when the collet is drawn into the shell. The outer shell 27 is removably held on the collet 28 by means of a bolt 34 which extends through the rear portion of the shell and is threaded into the rear portion of the collet. A washer 35 is inserted between the head of the bolt and the outer shell surface. By screwing the bolt into the collet, the collet can be drawn into the outer shell, thereby camming the lips 32 firmly into engagement with the cylinder 11 inwardly of the shoulder 18 so that further movement of the collet into the shell can exert a pulling force on the cylinder. When the bolt is loosened, the collet can be moved outwardly with respect to the shell.

In order to seat the lip over the shoulder of the lock cylinder, a twisting motion may be required. The torque to produce this twisting motion can be applied to the tool by means of a long screw which projects from the side of the tool, such as the Allen socket screw 36. The screw 36 is threaded into a hole 37 on the side of the collet 28. Screw 36 projects through a slot 38 extending longitudinally along the outer shell 27. The length of the slot allows the collet to be moved forward or backward in the shell without removal of the screw 36. The collet 28 can be removed from the outer shell 27 by turning the bolt 34 so that it becomes unthreaded from the collet 28 and by removing screw 36 from the hole 37 in the collet 28.

Figure 2:
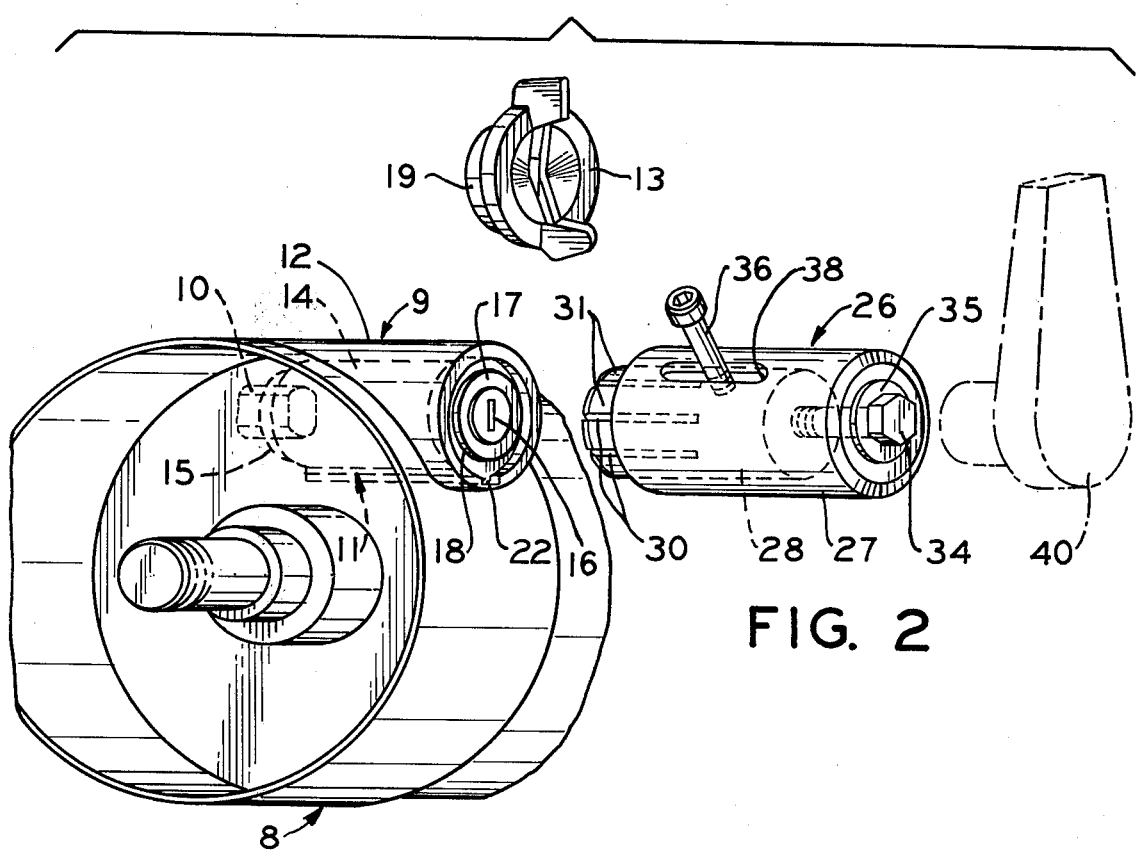
FIG. 2 is a perspective view of the lock and steering column of FIG. 1 with the ignition cylinder cap removed and with the tool of the present invention before insertion.

By using the tool of the present invention, ignition cylinder locks can be removed from steering columns quickly and easily. First, the cylinder cap 13 is pried loose by placing a screw driver or a similar tool under one ear of the cap. Removal of the cap 13 exposes the head 17 of the lock cylinder with its shoulder 18. Then the lip 32 of the collet 28 is pushed over the shoulder 18. Although this can be done with the outer shell 27 over the collet as shown in FIGS. 2 and 3, this procedure is preferably accomplished after first removing the collet from the outer shell. The collet 28 alone is then pressed over the cylinder shoulder 18. In addition to applying pressure on the collet, a twisting motion may be required. The twisting motion can easily be achieved by first inserting the cap screw 36 into the collet 28; the screw provides a handle for applying additional torque.

After the lips 32 have been fully seated over the shoulder 18 of the cylinder 11, the screw 36 is removed from the collet 28, and the outer shell 27 is applied over the collet. The bolt 34 with the washer 35 in place is inserted into the rear portion of the outer shell 27 and threaded into the collet 28. The outer shell 27 is then rotated so that the side hole 37 in the collet is aligned with the slot 38 in the outer shell, and the screw 36 is then inserted through the slot and threaded into the hole 37. By using a wrench, such as a socket wrench 40 in FIG. 2, the bolt 34 is tightened causing the outer shell 27 to move forward until it is flush against the housing 12 as shown in FIG. 4. As the outer shell 27 surrounds the fingers 31 of the collet, it exerts a radially inward force on the fingers. This force retains the lip 32 over the shoulder 18 and aids the collet in gripping the lock cylinder. At the same time, the engagement of the forward end of the outer shell against the housing 12 provides a fixed point so that the collet can pull out the cylinder upon continued movement of collet into the shell. After engagement of the end of the shell with the housing, a few additional turns of the bolt 34 will cause the collet to pull the lock cylinder 11 out of the housing 12. The force of the withdrawing collet causes the outer portion 14 of the cylinder directly behind the retainer pin 22 to break, freeing the cylinder as shown in FIG. 5.

The portion of the cylinder broken off will usually come out with the lock cylinder or will remain within the housing cavity so that it can be taken out after removal of the cylinder. Preferably, the bolt 34 is turned slowly until the outer portion 14 cracks, and then the bolt is turned back one-half turn. This procedure cracks the outer portion 14 without breaking it. The cracked outer cylinder portion causes the retainer pin 23 to become disengaged from its spring. Gravity forces the retainer pin down, allowing easy removal of the lock cylinder.

After removal of the old lock cylinder, a new cylinder with an attached cap can be inserted. Also, when the cylinder is removed the connecting member 10 can be turned by a screw driver to unlock the steering column and turn on the ignition and actuate the starter, if desired.

While the invention has been shown and described with the respect to specific embodiment thereof, these are intended for the purpose of illustration rather than limitation, and other modifications and variations will be apparent to those skilled in the art all within the intended spirit and scope of the invention.

I claim:

1. A tool for removing a lock cylinder from a lock housing, the lock cylinder having an exposed outwardly projecting shoulder around the forward portion of the cylinder, the tool comprising:

a cylindrical inner collet having a bore which extends inwardly from the forward edge of the collet and which provides a hollow interior, the collet having a plurality of slots extending longitudinally inwardly from the forward edge of the collet and extending less than the entire length of the collet, said slots providing a plurality of circumferentially disposed longitudinally extending fingers, each having a lip extending radially inwardly at the forward edge of the collet, the forward edge of the lip being beveled to facilitate application of the lip over the shoulder of the cylinder, the collet also having a hole along the side of the collet;

an outer shell which fits over the collet, the shell having a cylindrical bore which extends inwardly from the forward edge of the shell and which provides a hollow interior, the inner diameter of the hollow shell interior slightly greater than the outer diameter of the collet permitting the shell to fit over the collet, the shell urging the fingers firmly into engagement with the lock cylinder when the collet is drawn into the shell, the inner forward edge of the shell being beveled to aid in urging the lips inwardly, the shell also having a slot running longitudinally along the side of the shell;

means for drawing the collet into the shell interior, which drawing means being inserted through the rear portion of the outer shell and threaded into the rear portion of the collet along the common axis of both the collet and the outer shell; and means for holding the collet and preventing it from turning when the collet is being drawn into the shell, said holding means extending radially outwardly from the collet and the shell and being threaded into the hole along the side of the collet and extending through the slot along the side of the shell.

2. The tool of claim 1 in which the fingers of the collet are made of flexible resilient material so that the forward edge of the collet can be expanded radially outwardly when the lip is being placed over the shoulder and contracted back into engagement with the cylinder as the collet is drawn into the shell.

3. A tool for removing a lock cylinder from a lock housing, the lock cylinder having an exposed outwardly projecting shoulder around the forward portion of the cylinder, the tool comprising:

a cylindrical inner collet having a bore which extends inwardly from the forward edge of the collet and which provides a hollow interior, the collet having a plurality of slots extending longitudinally inwardly from the forward edge of the collet and extending less than the entire length of the collet, said slots providing a plurality of circumferentially disposed longitudinally extending fingers, each finger having a lip extending radially inwardly at the forward edge of the collet, the forward edge of the lip being beveled to facilitate application of the lip over the shoulder of the cylinder, the fingers made of flexible resilient material so that the forward edge of the collet can be expanded radially outwardly when the lip is being placed over the shoulder and contracted back into engagement with the lock cylinder, the collet also having a hole along the side of the collet;

an outer shell which fits over the collet, the shell having a cylindrical bore which extends inwardly from the forward edge of the shell and which provides a hollow interior, the inner diameter of the hollow shell interior slightly greater than the outer diameter of the collet permitting the shell to fit over the collet, the shell camming the lips firmly into engagement with the cylinder inwardly of the shoulder when the collet is drawn into the shell, the inner forward edge of the shell being beveled to aid in camming the lips inwardly, the shell also having a slot running longitudinally along the side of the shell;

a bolt inserted through the rear portion of the outer shell and threaded into the rear portion of the collet along the common axis of both the collet and the outer shell; and a screw extending radially outwardly from the collet and the shell which is threaded into the hole along the side of the collet and which extends through the slot along the side of the shell.

* * * * *